US006294038B1

(12) United States Patent
Majkrzak

(10) Patent No.: US 6,294,038 B1
(45) Date of Patent: Sep. 25, 2001

(54) APPARATUS AND METHOD FOR APPLYING LINERLESS LABELS

(75) Inventor: Gerald A. Majkrzak, Vadnais Heights, MN (US)

(73) Assignee: Advanced Label Systems, Inc., St. Paul, MN (US)

( * ) Notice: Subject to any disclaimer, the term of this patent is extended or adjusted under 35 U.S.C. 154(b) by 0 days.

(21) Appl. No.: 09/243,498

(22) Filed: Feb. 3, 1999

Related U.S. Application Data

(63) Continuation-in-part of application No. 09/129,723, filed on Aug. 5, 1998.

(51) Int. Cl.[7] .............................................. B32B 31/00

(52) U.S. Cl. .......................... 156/238; 156/302; 156/541; 427/146

(58) Field of Search .................................... 156/541, 542, 156/302, 248, 257, 265, 268, 269, 238; 427/146

(56) References Cited

U.S. PATENT DOCUMENTS

| | | | |
|---|---|---|---|
| 2,492,908 | 12/1949 | Von Hofe | 216/55 |
| 3,869,328 * | 3/1975 | Instance | 156/285 |
| 4,468,274 | 8/1984 | Adachi | 156/320 |

(List continued on next page.)

FOREIGN PATENT DOCUMENTS

| | | |
|---|---|---|
| 4217422 | 12/1993 | (DE) . |
| 29501739 | 2/1995 | (DE) . |
| 0281064 | 9/1988 | (EP) . |
| 0764603 | 3/1997 | (EP) . |
| 0802140 | 10/1997 | (EP) . |
| 96/09168 | 3/1996 | (WO) . |
| 97/16370 | 5/1997 | (WO) . |

OTHER PUBLICATIONS

"Accraply High Speed Panel Labler 900P", Product Brochure, 2 pages, (1994).

"Guide to Mono–WebLinerless Lables", CCL Label—The Packaging And Promotional Communications Company, Product Brochure, 4 pages, (Nov. 1997).

*Primary Examiner*—Linda Gray

(74) *Attorney, Agent, or Firm*—Mark A. Litman & Assoc; Mark A. Litman

(57) ABSTRACT

A method, module and apparatus useful in the application of linerless labels to surfaces of elements is provided in a methodology so that conventional linered label applicators can be used with linerless labels. A source of linerless labels is provided comprising a composite of an elongate sheet of reusable, temporary liner having adhered to a low adhesion surface of the reusable, temporary liner an adhesive face of a cut linerless label, the composite being rolled into a roll. The source of linerless labels is used in a method for enabling a linered label applicator to accept linerless label sheet for application to the surface of elements comprising associating a source of precut linerless labels on a roll of reusable, temporary liner sheet to a linered label applicator so that a composite of:

a) the reusable, temporary liner sheet and b) cut-out linerless labels is fed into the linered label applicator where linered label is normally directed into the linered label applicator. Another method for creating a label on a temporary reusable carrier comprises the steps of:

a) printing an image onto at least one face of a first sheet material;

b) applying adhesive to at least one face of the printed first sheet material;

c) cutting the sheet material into individual labels;

d) applying a face of the individual labels to a temporary reusable carrier sheet to form a sheet of label stock; and e) rolling the sheet of label stock into a roll of label stock.

11 Claims, 3 Drawing Sheets

U.S. PATENT DOCUMENTS

| | | | | |
|---|---|---|---|---|
| 4,650,533 | * | 3/1987 | Parker et al. | 156/219 |
| 4,978,415 | | 12/1990 | Jones | 156/517 |
| 5,378,301 | | 1/1995 | Boreali et al. | 156/344 |
| 5,417,783 | | 5/1995 | Boreali et al. | 156/64 |
| 5,540,369 | | 7/1996 | Boreali et al. | 225/4 |
| 5,560,293 | | 10/1996 | Boreali et al. | 101/288 |
| 5,573,621 | | 11/1996 | Boreali | 156/256 |
| 5,578,352 | | 11/1996 | Smith | 428/40.01 |
| 5,674,345 | | 10/1997 | Nash | 156/254 |
| 5,713,679 | | 2/1998 | Taylor | 400/621 |
| 5,721,291 | | 2/1998 | Gaulle | 522/38 |
| 5,725,719 | | 3/1998 | Szczepaniec | 156/353 |
| 5,776,284 | * | 7/1998 | Sykes et al. | 156/252 |
| 5,776,289 | | 7/1998 | Steidinger | 156/273.1 |
| 5,788,806 | | 8/1998 | Bradshaw | 156/539 |
| 5,806,713 | * | 9/1998 | Dudley et al. | 221/73 |
| 5,843,272 | * | 12/1998 | DeVale et al. | 156/542 |

* cited by examiner

APPARATUS AND METHOD FOR APPLYING LINERLESS LABELS

This application is a continuation-in-part of U.S. Ser. No. 09/129,723, filed Aug. 5, 1998.

BACKGROUND OF THE INVENTION

1. Field of the Invention

The present invention relates to the field of labels which are provided without separation liners between the labels and layers of supply of labels, and rolls, especially linerless labels provided in roll form. The present invention also relates to apparatus and methods for applying linerless labels to substrates.

2. Background of the Invention

Labels which are not provided to commerce with liners over an adhesive face, referred to in the art as linerless labels, are less expensive than lined labels, more labels can be provided in a roll of a given diameter than conventional labels with release liners, and they are more environmentally friendly since they do not require the disposal of liners after use. Linerless labels should also be less expensive since one entire element (the liner) may be removed from the manufacturing cost of the label. Liners can constitute 35% to 50% of the total cost of a lined label construction. For these and other reasons, linerless labels are achieving increased popularity. Equipment for applying linerless with rewettable or thermal sensitive adhesives to a wide variety of moving elements (such as substrates, bottles, or packages) is fairly common, as shown in U.S. Pat. Nos. 2,492,908 and 4,468,274. However, the application of unlined pressure sensitive adhesive labels to moving elements although known in the art, is uncommon (e.g., U.S. Pat. No. 4,978,415), and does not have the versatility to apply the labels to all sorts of moving elements, such as envelopes, webs, bottles, cans, and packages.

According to U.S. Pat. No. 5,674,345, a method and apparatus are provided which quickly, positively, and in a versatile manner apply linerless pressure sensitive adhesive labels to moving elements. The equipment and method are versatile since they may be utilized with envelopes, packages, substrates, bottles, cans, packages and a wide variety of other moving elements, and the method and apparatus typically are practiced so as to leave no skeletal web after the labels are formed, thus avoiding any necessity of disposing of any waste label material According to the apparatus of that invention, means for mounting a supply of linerless label tape having a release coated face and adhesive (typically pressure sensitive adhesive) face is associated with a number of novel apparatus elements according to the invention. These novel elements include a non-stick circumferential surface feed roll, a hardened vacuum anvil cylinder cooperating with a cutting cylinder having a radially extending knife blade, which in turn cooperates with a wiper roller that applies liquid release material to the blade after each cut, and transport means having many unique features. The transport means includes a plurality of conveyor tapes which are spaced in a direction transverse to the direction of conveyance of labels thereby, and a vacuum chamber assists the adhesive from the labels in maintaining the labels in position on the conveyor tapes during conveyance. The conveyor tapes are typically substantially circular in cross section so as to present a minimal area for engagement with the label adhesive, and the labels are separated from the conveyor tapes by a plurality of non-stick surface stripper rings which extend upwardly above the top surface of the conveyor tapes, and are associated with a peeler roller which bends the labels upwardly as they are deflected by the stripper rings. From the peeler roller and stripper rings the labels are moved directly into contact with a moving element. Where, as typical, the labels are moved into contact with moving envelopes, the labels and envelopes pass through nip rollers whereby the pressure sensitive adhesive is activated.

Linerless labels have also become increasingly more popular because of the many advantages associated therewith. When any labels, including linerless labels, are used, it also is necessary to be able to automatically print the labels in a cost-effective manner. One way this can readily be accomplished is by using a thermal printer, either a thermal printer having a thermal printhead with a thermal ribbon unwind and rewind system, or a thermal printer with a direct thermal printhead. Conventional thermal printers are not capable of printing linerless labels, however, because there will be surfaces thereof which necessarily come into contact with the uncovered adhesive face of the linerless labels as the labels are being fed to the printhead, during printing, or afterwards. According to U.S. Pat. No. 5,560,293, a variety of thermal printers are provided which overcome this problem and are eminently suited for effective printing of linerless labels. The linerless labels printed according to the present invention may be almost any type of linerless labels, such as for example, thermal ribbon embodiments shown in U.S. Pat. No. 5,354,588 and direct thermal printer embodiments such as shown in U.S. Pat. No. 5,292,713.

U.S. Pat. No. 5,560,293 describes a thermal printer which prints linerless labels in such a way that printer components will not stick to the adhesive face of linerless labels. Substantially stationary printer components, such as a label guide, transport plate, front panel, and stripper blade, preferably have the adhesive face engaging surfaces thereof plasma coated so that adhesive will not stick to them. An optional cutter provided downstream of the stripper blade also has plasma coated surfaces. A driven platen roller has a surface thereof coated with or covered by a high release silicone, which will not stick to the adhesive, but has high friction characteristics to facilitate drive of the labels. In a direct thermal printer, a plasma coated tear off surface is downstream of the driven platen roller, and stripper belts, a second roller with O-rings, and the like are provided to prevent the labels from wrapping around the driven platen roller. One or more sensors may also be provided for controlling drive of the platen roller in response to the position of registration marks on the linerless labels. According to one aspect of that invention a thermal printer for printing linerless labels, having an uncovered adhesive face, is provided comprising the following elements: a linerless label unwind; a substantially stationary label guide; a substantially stationary transport plate; a rotatable driven platen roller; a printhead cooperating with the print roller; and, the label guide and transport plate having surfaces which engage the adhesive face of linerless labels from the label unwind, the adhesive-engaging surfaces comprising plasma coated surfaces which substantially prevent the label adhesive from adhering thereto. The printhead preferably comprises a thermal printhead, and a thermal printer unwind and rewind system is associated with the printhead that provides the thermal ribbon between the printhead and the driven platen roller. The driven platen roller preferably has a peripheral surface thereof which is coated with a high release silicone which has both non-stick characteristics with respect to the adhesive face of the linerless labels, but also high friction characteristics to facilitate driving of the labels. Any other substantially stationary surfaces of the printer which are also likely to come into contact with the adhesive face of the linerless labels-such as a front panel-are also plasma coated. The transport plate may be grooved to minimize the surface area that engages the label adhesive face. The printer also preferably comprises a stripper blade/bridge mounted on the opposite side of the driven platen roller from the label unwind, in the direction of label conveyance through the printer. The stripper blade/bridge is positioned with respect to the driven platen roller and the printhead so as to prevent a printed label from being wound onto the driven platen roller and assists the label moving from the platen roller to the cutter. The stripper blade/bridge has a surface which has a non-stick feature, preferably a plasma coating, and typically the stripper blade/bridge may be mounted directly on a pre-existing tear bar on the printer. According to that invention a conventional thermal printer may readily be modified merely by substituting the particular non-stick label guide, transport plate, and driven platen roller according to the invention, and mounting the stripper blade/bridge on the existing tear bar.

Linerless labels are produced, for example, by feeding a tape having a release coated face and an adhesive face to a hardened anvil vacuum cylinder, utilizing a non-stick circumferential surface feed roll. A knife blade on a cutting cylinder is rotated into contact with the tape at the anvil cylinder to cut the tape into linerless labels, and release liquid is applied to the blade after each cut. From the anvil cylinder the labels are deposited on a plurality of spaced conveyor tapes of circular cross section with the adhesive faces contacting the conveyor tapes. A vacuum chamber assists in holding the labels on the conveyor tapes. The release coat faces of the labels conveyed by the conveyor tapes may be heated and then printed with hot melt ink from an ink jet printer. The labels are separated from the conveyor tapes using a peeler roll and non-stick stripper rings, and then immediately contact a moving web or other elements to which they are to be applied, with the label and web passing through nip rolls to activate the pressure sensitive adhesive.

In spite of the benefits which are obvious from the proposed and actual use of linerless labels, the growth of the technology has not been as rapid in commerce as has been expected. The reduced rate of acceptance is due at least in part because the present capability of application equipment is significantly slower than for lined labels. In production and supply, faster rates without waste are critical to levels of efficiency, productivity and profitability. Significantly slower equipment, such as the present linerless label application systems which operate at speeds one fourth to one half the speed of lined label applicators, reduce cost competitive aspects of the linerless label. Additionally, the cost of equipment specific to linerless labels requires an independent capital investment for equipment which is useful only for the linerless labels. For a manufacturer to convert from a lined label process or to add a lined label process to his business, a completely new apparatus has to be purchased. At a cost of hundreds of thousands of dollars, this is not a highly attractive scenario for labeling companies.

According to the invention described in copending U.S. patent application Ser. No. 09/129,723, filed on Aug. 5, 1998, a method and apparatus are provided which quickly, positively, and in a versatile manner apply linerless pressure sensitive adhesive labels to moving elements. The equipment and method are versatile since they may be used with any substrate, including for example envelopes, packages, bottles, cans, packages and a wide variety of other moving elements, may be used with any available linerless label, and the method may be used on existing commercial apparatus by the addition of an inventive module according to practice of the present invention. The process of that present invention comprises associating the linerless label with a temporary, reusable support (temporary, reusable liner) on line or immediately before introduction to the label application apparatus, stripping the label from the temporary, reusable support, winding up the temporary support, and reusing the temporary support again to support a linerless label for introduction into commercial lined label applicators with stripping capability.

SUMMARY OF THE INVENTION

The present invention provides an alternative method of using linerless label stock with conventional lined label application apparatus by applying linerless label stock to a reusable, temporary support before the linerless label stock is associated with apparatus directly connected to the lined label application apparatus. In this manner, the economic advantages of reusing the essentially continuous support layer used to carry the label stock into the applicator is continued, but also the roll of linerless stock material may be provided to the ultimate customer of the printshop or applicator shop without that ultimate customer having to be concerned even with the addition of supplemental apparatus such as the component described in U.S. patent application Ser. No. 09/129,723. The apparatus on site with the ultimate customer does not have to be modified in any way from the conventional apparatus used to apply conventional liner label stock.

Linerless label stock is applied to a temporary reusable carrier with the label shapes precut or then cut while the stock is on the temporary support. The framing segments of the cut-out labels is removed prior to, during or after application of the linerless label stock to the reusable, temporary carrier. Printing of the labels may be done during manufacture of the linerless label stock, after manufacture of the linerless label stock, before cutting of the linerless label stock, after cutting of the linerless label stock, before application of the linerless label stock to the reusable, temporary support or after application of the linerless label stock to the temporary, reusable support.

An additional process and apparatus for the practice of the present invention comprises a means for reducing the amount of work that has to be performed on a single line, separating the work onto different lines and even different locations which can reduce crosscontamination problems of materials used in different segments of the overall process. Particularly the invention allows for printing onto sheets which are cut into materials which form rolls of labels or printing onto the material and directly rolling the printed sheets. Then on a separate line (distinct from the printing line), hot melt adhesive is applied to the face of the sheet away from the printing (or on the printed face if the label is to be applied printed surface down), preferably, but not necessarily after cutting into the roll width of the printed sheet. The printed sheet with adhesive is then cut (e.g., die cut) into the shape desired for the label, and the cut labels are applied (without the severed and separated matrix which surrounded the label) onto a reusable carrier or reusable liner to form a fully assembled label supply roll with a reusable carrier. It is novel according to the present invention to form the roll in the order of printing onto the sheet, applying the adhesive, cutting the labels, and then applying the labels onto the reusable temporary carrier.

DETAILED DESCRIPTION OF THE INVENTION

Figure 1:
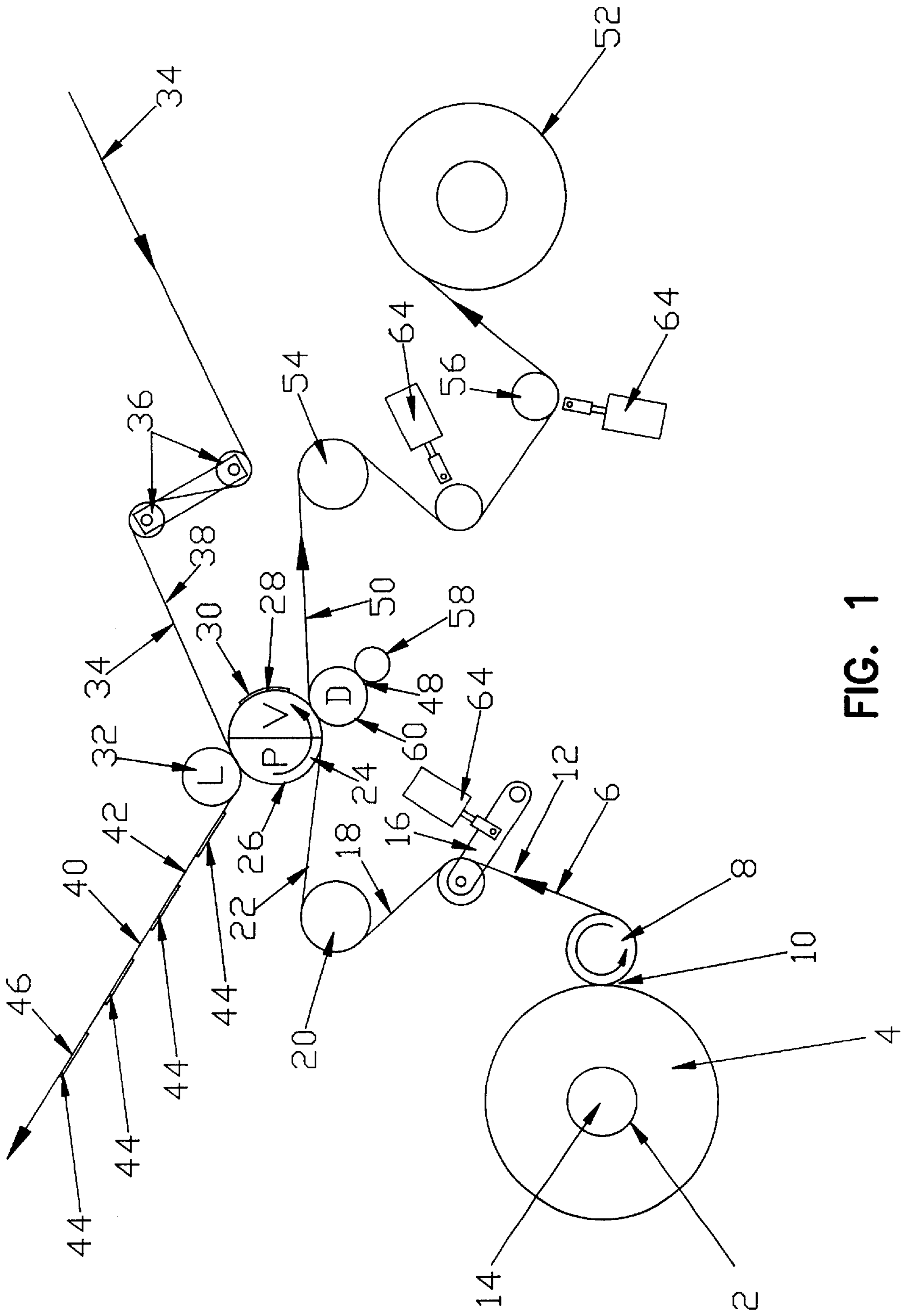
FIG. 1 shows a schematic of a module of the invention of copending U.S. patent application Ser. No. 09/129,723 which can be added to a commercial lined label applicator.

Linerless label tape conventionally has a label substrate, a release coated face and an adhesive (typically pressure sensitive adhesive, although thermal adhesives and solvent activatable adhesives are known) coated face. The linerless label is usually provided in roll form or stacked form, with the adhesive face of a sheet or roll in contact with the release coated face of another sheet or the adjacent rolled layer. The label is cut, partially cut or precut directly from the roll or sheet in the stack and applied to a substrate or element on which a label is to be applied. It is common in the art for the linerless label to be cut by a die, especially a cylindrical die, before the label is sent to the article to which the label is to be applied. The primary objective of the linerless label with respect to the more conventional lined label, is to eliminate the necessary step of disposing of the liner after the label is applied. This disposal is inconvenient, adds to the cost of the user, and usually increases the cost of the label material, since there is another layer of material which is present in the final article.

As previously noted, however, the use of linerless labels has been restrained by the need for additional capital expenditure as well as inefficiencies in the performance of the apparatus designed for linerless label application. The present invention addresses and reduces both of these concerns as an alternative to the apparatus, articles and methods of copending U.S. patent application Ser. No. 09/129,723.

That present invention may be practiced in two ways. First, an apparatus may be constructed with the built in capability of temporarily securing a linerless label to a temporary, reusable support. Second, a module may be provided which can be attached to existing lined label applicator machines which enables those lined label applicators to apply linerless labels. Lined labels are applied to substrates or elements by feeding the lined label stock with liner into an applicator. The applicator may receive die-cut lined label stock or provide die cutting within the applicator itself. The label, either before die cutting (with subsequent die cutting performed within the system) or after die cutting is stripped from the liner by a stripping element (e.g., blade, reduced pressure, scraper, flexer, peeler, bender or the like) and the shaped label is applied to the surface on which a label is desired. These systems for application of lined labels are readily available from various manufacturers and perform quite efficiently. The module of the present invention effectively creates a temporarily lined linerless label, removes the temporary liner, and then recycles the liner. By recycling the liner, which may be the same as or slightly modified from conventional liners, the disposal of liners is significantly reduced. By recycling a liner once, the costs of material and disposal for the liner are reduced 50%, and by recycling the liner the expected twenty or so times, the cost of the liner is reduced by 95%. Even by recycling a liner merely three times, which can be readily done with conventional label liner materials, the cost savings in materials and disposal for the liner is 75%. As can be seen from the cost efficiencies, only modest numbers of recycling need be done to provide significant economic advantage and significantly equivalent reductions in waste disposal costs.

That invention may at least in part be described as a module for adapting apparatus which strips liners from a label and applies labels to a substrate, the module enabling the apparatus to apply linerless labels, the module comprising:

- a source of linerless label sheet,
- a source of liner sheet,
- a roll for guiding the linerless label sheet after removal from the source of linerless label,
- a die cutter and an anvil roller defining an area through which linerless label sheet may move between said die cutter and anvil roller,
- a laminator roller adjacent to the anvil roller defining an area between the anvil roller and the laminator roller through which both liner sheet and cut-out linerless labels from the linerless label sheet may move between the anvil roller and the laminator roller to form a temporary support of the liner for cut-out linerless label. The roll for guiding the linerless label web from the wound roll may, for example, comprise a top riding roller. Between the roll for guiding the linerless label and the anvil roller and die cutter, there may be a tension controller, such as a dancer, pneumatic or hydraulic tension controller, spring tension controller, and the like. The die cutter may be, for example, a reciprocating die cutter, hammer die cutter or a die cutting roller and anvil. In the operation of the module and apparatus, a matrix may be formed from removal of cut-out labels from the linerless label sheet and the matrix is wound on a take up roll. The module may be constructed as a single free-standing module within a frame or housing which may be attached to said apparatus. The free-standing frame or housing may have feed sources of the liner and/or the linerless label separated from the module or as separate independent modules or elements attached to or associated with the module where the linerless label sheet is cut and secured to a temporary, preferably reusable support or liner.

Where an anvil roller is used, the anvil roller may have openings on its surface through which reduced gas pressure (vacuum) may be applied to hold cut-out label as the anvil roller turns. To reduce any tendency of the die cutter to build up adhesive or other material on its surface, a lubricant may be applied to the die cutter, as by a lubricator applicator or supplier of lubricant or antistick liquid.

An apparatus for applying labels to the surface of elements is created by positioning the module or multiple modules described above to feed a composite article comprising a temporary combination of said liner (e.g., temporary, reusable liner) and the cut-out linerless label and the apparatus including a separator or splitter (later described) for removing the cut-out linerless label from the temporary liner. The apparatus may also include a winding element for winding into a roll a matrix comprising liner from which cut-out linerless label has been removed. An apparatus is also provided for applying labels to the surface of elements, the apparatus comprising the module of the present invention positioned to feed a composite article comprising a temporary combination of said liner and said cut-out linerless label and said apparatus including:

a) a separator or splitter for removing cut-out linerless label from a temporary liner, b) a winding element for winding into a roll a matrix comprising liner from which cut-out linerless label has been removed, and c) a registration guide for linerless label between said roll for guiding said linerless label sheet after removal from the source of linerless label. The apparatus may provide the roll for guiding said linerless label as a top riding roller, and between the roll for guiding said linerless label and the anvil roller and die cutter, there may be a tension controller, and the die cutter may be a die cutting roller, and a matrix is formed from removal of cut-out labels from the linerless label sheet and the matrix is wound on a take up roll, and the anvil roller has openings on its surface through which reduced gas pressure may be applied to hold cut-out label as the anvil roller turns. The reduced pressure or vacuum may be controlled on the surface of the anvil so there is a holding effect as the cut-out linerless label is transported to the laminator roller and then the reduced pressure is lowered, stopped or positive pressure introduced through the openings to assist removal of the combined temporary, reusable liner and the cut-out linerless label. This apparatus may have the module as a single free-standing module within a frame or housing which is attached to the apparatus. The apparatus may provide the anvil roller with openings on its surface through which reduced gas pressure may be applied to hold cut-out label as the anvil roller turns.

A method is also described in copending U.S. patent application Ser. No. 09/129,723 for enabling a lined label applicator to accept linerless label sheet for application to the surface of elements comprising securing a module of the invention to a lined label applicator so that a composite of:

a) liner sheet as a temporary liner sheet and b) cut-out linerless labels from the linerless label sheet is fed into a lined label applicator where lined label is normally directed in the lined label applicator. A method of applying linerless labels to a substrate after enabling a enabling a lined label applicator to accept linerless label sheet for application to the surface of elements is also described wherein cut-out linerless label is removed from a temporary liner sheet, and the cut-out linerless label is applied to a substrate. This method may be further practiced whereby after removal of cut-out linerless label from the temporary liner sheet, the used temporary liner sheet is wound into a roll. Afterwards, the roll into which said temporary liner sheet is wound is used to feed liner as a source of liner sheet in a module comprising:

a source of linerless label sheet, a roll for guiding linerless label sheet after removal from the source of linerless label, a die cutter and an anvil roller defining an area through which linerless label sheet may move between a die cutter and anvil roller, a laminator roller adjacent the anvil roller defining an area between the anvil roller and laminator roller through which both liner sheet and cut-out linerless labels from the linerless label sheet my move between the anvil roller and the laminator roller to form a temporary support of the liner for cut-out linerless label.

It is also desirable, as an alternative, to provide a prerolled (and preferably preprinted) source of fully separated or fully segmented linerless labels on a recyclable temporary support. The source roll itself is also novel, as an adhesive-backed label, with a release coating on the surface to which the adhesive on the backing will not adhere, has not previously been provided on a temporary, reusable liner.

The novel supply roll may be produced in a number of different ways, depending upon the manner in which the supply may be ultimately used. Among the more useful methods of constructing this format of prerolled linerless labels are:

1) providing a stream of linerless labels off the manufacturing line, before being rolled, partially severing individual labels on the continuous sheet, and applying the continuous sheet with severed labels to the temporary, reusable support, and then rolling the label/support composite, with or without a core support;

2) providing a stream of linerless labels off the manufacturing line, before being rolled, completely or partially severing individual labels on the continuous sheet, and separating the labels from the cutoff framing segment(s) with the individual linerless labels spaced and supported on the reusable support, then rolling the label/support composite, with or without a core; the labels may be separated from the frame segment(s) before, during or after application of the labels so the temporary support (in any of these listed alternatives); and 3) providing a roll of linerless labels, unrolling the linerless labels, severing (or partially severing the individual labels and associating the stream of labels (with or without the framing segment(s) with a temporary, reusable support, removing the framing segment(s) from the linerless label continuous sheet before, during or after association with the temporary support, except that the labels are severed on the temporary support, and then applying the individual label/support composite to a label applicator or rolling the label/support composite into a roll (with or without a core) before introduction to an applicator.

In the practice of these three methods, a number of alternatives and options may be used. The labels or linerless label stock may be printed at any time, such as before application of the adhesive, before or after severing of the individual labels, before or after separation of the labels from the framing segment(s), or before or after application of the linerless labels to the temporary reusable support.

The linerless label sheet or individual labels may be applied to the temporary, reusable support, may be severed or cut into individual labels, may be printed, and may be in any other way processed on commercially available equipment, and in similar processes as lined labels are treated. Once the roll or stream of linerless labels on temporary, reusable support material composite has been formed, it may be used in a manner similar to the linerless labels/temporary, reusable support composite manufactured in line as described above. The composite may then be fed into a conventional label applicator.

A method for enabling a linered label applicator to accept linerless label sheet for application to the surface of elements according to this invention may be described as comprising associating a source of precut linerless labels on a roll of reusable, temporary liner sheet to the linered label applicator so that a composite of:

a) the reusable, temporary liner sheet and b) cut-out linerless labels is fed into the linered label applicator where linered label is normally directed into the linered label applicator. The cut-out linerless label may be removed from the reusable, temporary liner sheet, and the cut-out linerless label is applied to a substrate. After removal of cut-out linerless label from the reusable, temporary liner sheet, the reusable, temporary liner sheet would normally be wound into a roll. After the reusable, temporary liner sheet is wound into a roll, the roll is unwound and linerless label is applied to the reusable, temporary liner sheet. After the roll is unwound and linerless label is applied to the reusable, temporary liner sheet to form a recycled roll, supported linerless label from the recycled roll is fed into the linered label applicator where linered label is normally directed into the linered label applicator. The roll is used to feed liner on a reusable, temporary liner as a source of label, with the applicator normally operating by steps in the applicator comprising:

bending the linerless label on a reusable, temporary liner to partially remove at least a part of an edge of the linerless label from the reusable, temporary liner, having at least the lifted edge placed into contact with a surface to which the linerless label is to be applied, and attaching the linerless label to the surface.

As with the linerless label/temporary, reusable support composites manufactured in line, the temporary support is stripped from the labels in the applicator, the support rolled, and the support unrolled and new linerless labels or linerless label stock applied thereto.

Another way of provided rolled sheet material according to the present invention comprises a method for creating a label on a temporary reusable carrier comprising the steps of:

a) printing an image onto at least one face of a first sheet material;

b) applying adhesive to at least one face of the printed first sheet material;

c) cutting the sheet material into individual labels;

d) applying a face of the individual labels to a temporary reusable carrier sheet to form a sheet of label stock; and e) rolling the sheet of label stock into a roll of label stock.

The method will usually have label stock from the roll of label stock fed into a label applicator, where labels from the label stock are applied to substrates, and the temporary carrier is collected as a roll. The method also desirably has the collected roll of temporary carrier subsequently provided as a liner for labels. The method also is practiced by having the collected roll of temporary carrier subsequently provided as a temporary reusable carrier after repetition of steps a), b) and c) on a second printed sheet material that is different from the first sheet material. By different from the first sheet is meant that it is a different sheet, not that the printing is required to be different on the second printed sheet material.

Reference to FIG. 1 will assist in explaining the module which can be used in the practice of copending U.S. patent application Ser. No. 09/129,723. An unwind carrier 2 having a roll of linerless label 4 is provided. The unwind carrier 2 is preferably powered as this assists in controlling the tension on the linerless label 6. A roller 8, preferably a top riding roller 8, assists in the removal of the linerless label 6 at an angle at point 10, between the top riding roller 8 and the roll of linerless label 4. The roll of linerless label 4 preferably has the linerless label 6 rolled so that the adhesive face 12 of the linerless label faces the center 14 of the unwind 2. The linerless label 6 is optionally advanced in the system to a tension control element 16 which is optionally a dancer. It is also desirable to have the linerless label material 18 after removal advanced over a registration roll or pull/registration roll 20. These two elements, the dancer 16 and the registration roll or pull registration roll 20 are preferred embodiments, a site where the linerless label sheet 22 can be temporarily supported on a reusable carrier. In this figure, the linerless label sheet 22 is fed between an anvil roll 24 and a die cutter 48, but not essential to the practice of the invention, which requires only that a linerless label sheet 22 be fed towards cutter 48 facing the anvil roller 24. The anvil roll 24, preferably a vacuum pressure anvil roller 24, has a surface 26 which faces die cutter 48 which severs the linerless label. The die cutter 48 faces the adhesive face of the linerless label 22 (with a thermal, pressure-sensitive, water- or organic solvent-soluble adhesive) to cut the sheet of linerless label 22. The non-adhesive face of the linerless label 22 may be severed by the die cutter 48, for example, by having an additional roller between the die cutter 48 and the laminator roll. The die cut linerless label 28 with its adhesive (e.g., pressure sensitive adhesive,) face 30 is carried on the surface 26 of the anvil roll 24, preferably a vacuum pressure anvil roller 24 with a die cutter 48 towards a laminator roll 32. A liner 34 is fed from a source (e.g., a roll, not shown) of recyclable/reusable liner material. Web steering guide rollers 36 may be used to direct the liner 34 towards the laminator roll 32. The liner 34, with its release coated surface 38 facing the adhesive coated surface 30 of the die cut linerless label 28 is laminated to the die cut linerless label 28 to form a temporary linerless label/carrier system 40 comprising a reusable liner/carrier 42 having a series of previously linerless die cut labels 44 with their adhesive faces 46 against the reusable carrier/liner. This temporary linerless label/carrier system 40 may be then treated and applied to a substrate by conventional lined label applicator systems (not shown) effectively as a lined label, even though provided initially as a linerless label. As shown in the Figure, the anvil 24 has a vacuum area V and a positive P pressure area on the anvil 24 so that linerless label is supported on the anvil 24 while it is cut and being carried, and neutral pressure or positive pressure when it is desired for the cut label to be released. The temporary linerless label/carrier system 40 may then be split or separated at the interface of the adhesive of and the release surface of the temporary, reusable liner. The label 44 applied to a substrate (not shown), and the liner wound on a capture system (e.g., a roll, not shown). The wound used liner (not shown) may then be used as the source of liner 34 which is fed towards the laminator roll 32. Tension controlling elements 64 that are basically a controlled circuit are associated with the transducer roll 56 and dancer 16 to assure that tension can be adjusted as needed as the matrix 50 passes over idler roller 57.

A matrix 50, comprising the residue of the linerless label 22 after the die cut label 28 is removed from the linerless label 22, is carried away from the anvil roll 24, preferably a vacuum pressure anvil roller 24 with a die cutter 48, towards a matrix rewind (e.g., a take up rewind) 52. There is preferably an outfeed pull roll 54 and a transducer roll 56 between the die cutter 48 and the matrix rewind 52. This complete module may be attached or inserted to the conventional lined label applicator so that the temporary linerless label/carrier system 40 is fed into the conventional lined label applicator system at the point where a lined label is normally fed. This physical attachment may be done by snapping the module into receptors on the apparatus, by bolting or welding the module onto the lined label applicating apparatus, by associating an additional frame adjacent to the lined label applicating apparatus, or by any other physical means of associating the module to the lined label applicator. The module can also be a stand alone unit, allowing the reusable liner to feed into the lined label applicator system. In this manner, the module does not have to be physically fixed directly to the structure of the lined label applicator.

This system may, as previously mentioned, be used with commercial applicators, conventional applicators, conventional label liners, and commercial linerless label stock and rolls. Other optional elements within the lined label applicator include a non-stick circumferential surface feed roll, a hardened vacuum anvil cylinder cooperating with a cutting cylinder having a radially extending knife blade, which in turn cooperates with a wiper roller that applies liquid release material to the blade after each cut, and transport means having many unique features. The transport means may include a plurality of conveyor tapes which are spaced in a direction transverse to the direction of conveyance of labels thereby, and a vacuum chamber assists the adhesive from the labels in maintaining the labels in position on the conveyor tapes during conveyance. The conveyor tapes may be typically substantially circular in cross section so as to present a minimal area for engagement with the label adhesive, and the labels are separated from the conveyor tapes by a plurality of non-stick surface stripper rings which extend upwardly above the top surface of the conveyor tapes, and are associated with a peeler roller which bends the labels upwardly as they are deflected by a stripper such as stripper rings, blades, rolls or the like, or even lifted by reduced pressure supports (e.g., vacuum lifters). From the peeler roller and stripper, the labels are moved directly into contact with a moving clement. Where, as typical, the labels are moved into contact with moving envelopes, the labels and envelopes pass through nip rollers whereby the pressure sensitive adhesive is activated by pressure.

One aspect of a preferred embodiment of the present invention which helps differentiate the invention from other processes and materials is the use of a generally smaller scale carrier sheet onto which the label material is originally applied. This is because most commercial manufacture of labels would be on wide sheets which are then converted into smaller sizes (narrower widths) for application. In the present invention, as the carrier is reused, it is usually only converted once, and is slightly larger than the labels applied (e.g., labels as narrow as 1 cm, 2 cm, 5 cm or the like could be used, up to 10, 15, 20, 25 or up to 30 cm wide).

A printer, such as a thermal printer (dye hanger, due diffusion, mass transfer, etc.) or an ink printer such as a bubble jet printer, an ink jet print head or the like may also be provided in association with the conveyor tapes for printing indicia on the release coat face of the labels just prior to removal of the labels a conveyor tapes. If the ink is a hot melt ink, a heated platen is preferably provided over the release coat faces of the labels to heat them so that they are receptive to the hot melt ink.

The linerless labels may comprise a substrate having a release coated face and an opposite pressure sensitive adhesive coated face. The substrate of the label may be any sheet forming, film forming, or substrate forming material, preferably a flexible material such as paper, synthetic paper, non-woven sheets, fabric sheets, polymeric film or sheets, and the like. Polymer sheets and films of ethylenically saturated monomers (poly vinyl reasons, polyolefins, polyesters, and the like) and fabric sheets (e.g., pages, non-woven fabric, woven fabric, knitted fabric) are very useful. The adhesive may be a thermal adhesive (e.g., poly vinyl resin, polyamide, polyolefins, polyester, etc.), pressure sensitive adhesive (e.g., polyacrylate, polymethacrylate, polyurethane, polysiloxane, etc.) or solvent activatable adhesive (e.g., natural resins, synthetic resins, gums, esters, organic solvent soluble resins, water soluble or dispersible resins, polyvinyl alcohols, gelatins, polyvinyl pyrollidone, poly(meth)acrylates, polyolefins, polyvinylchloride, poly vinylidenechloride, polyvinylacetate, polyvinylacetals, cellulose resins, cellulose acetate butyrate, mixtures, printing on the release coated face while it is being transported in the second direction, and (e) continuously applying the printed labels to moving elements.

The following method steps may be practiced for applying the linerless labels to temporary, reusable liners: (a) feeding liner or tape comprising a substrate with a release coated face and an opposite pressure sensitive adhesive coated face in a first direction. (b) Cutting the tape into individual labels at a cutting position while the tape is being fed in the first direction. (c) Continuously transporting the labels away from the cutting position in a second direction, by disposing the labels on conveyors, with the adhesive coated face contacting a conveyor. And (d) continuously separating the labels from the conveyor while simultaneously applying the separated labels to moving temporary, reusable supports.

The following method steps may also be practiced for applying linerless labels to moving temporary, reusable supports: (a) Feeding the linerless label sheet comprising a substrate with a release coated face and an opposite pressure sensitive adhesive coated face in a first direction, (b) cutting the sheet into individual labels at a cutting position while the sheet is being fed in the first direction, by bringing the release coat face of the sheet into contact with a hardened anvil vacuum cylinder, and rotating a separating element such as a knife blade extending radially from a cutting cylinder into contact with the sheet, the knife blade extending transverse to said first direction, (c) continuously transporting the labels away from the cutting position in the second direction, and (d) continuously applying the labels to moving conveyors such as a moving liner.

Typically the elements to which the labels are applied may comprise moving envelopes, boxes, jars, bottles, packages, or the like in which case there is the further step of, after application of a label to a moving element, mechanically pressing the pressure sensitive adhesive coated face of the label into contact with the element to insure proper adherence between them, e.g. by passing them through a pair of nip rolls if thin enough or by using both a back support pressure and a front application pressure surrounding the label and the elements.

Other elements which are desirably present on the module include, for example, a lubricator applicating roll 58 which applies lubricant or release material to the cutting surface 60 surface of the die 48 where the die cutter 48 makes contact with the adhesive (either directly, br edge reside, or cutting through the label to adhesive on the other face), which is preferably in contact with the pressure sensitive adhesive surface (not indicated) of the linerless label 22. Sensing apparatus or elements (e.g., 64) may be present at various locations on the roll to sense and indicate to an operator or control system (e.g., computer or computer program) that the tension should be adjusted by movement of elements or speed adjustment of the system. The vacuum pressure anvil roller 24 may have areas with negative pressure V to secure the labels, or areas with variable pressure (e.g., negative pressure to hold the label, neutral or positive pressure P to release the die cut label 28).

The cutting apparatus may include a hardened anvil vacuum cylinder, rotatable about an axis parallel to the axes of rotation of an idler roll and a feed roll. At least the circumferential surface of the anvil vacuum cylinder should be hardened to preform an anvil function. A vacuum applied through the vacuum cylinder (vacuum cylinders per se are well known) holds the linerless label sheet, and the labels subsequently cut therefrom, on the peripheral surface. Cooperating with the hardened anvil vacuum cylinder for cutting the sheet tape into individual labels there may be provided a cutting cylinder having a radially extending knife blade (or radially spaced knife blades if desired). The cylinder is rotatable about an axis parallel to the axis of the anvil cylinder, and means are provided (such as a frame) for mounting the cutting cylinder adjacent to the anvil cylinder so that the cutting blade just barely makes contact with the hardened surface of the cylinder To prevent the knife blade from sticking to the sheet as it is cutting the labels, a small amount of liquid release material should be applied to the blade or to the sheet between successive cuts. This may be accomplished, for example, by an idler wiper roll which is a felt roll impregnated with release material, and is mounted for rotation about an axis parallel to the axis of rotation of the cutting cylinder, and adjacent to the cylinder, so that as the blade is rotated away from contact with the hardened anvil surface of the cylinder, it engages the felt and picks up a small amount of release liquid, incrementally rotating the wiper roll as it does so. This is only one of many obvious ways of applying release layers, others including sprays, rollers, drips, ligands, and the like.

The cut length of the labels is determined by the ratio of the feed roll revolutions to cutting cylinder revolutions (and number of cutting blade). This ratio may be changed by any conventional mechanism such as gears, single revolution clutches, or servo-motor controls.

The anvil vacuum cylinder transports the cut labels into association with the temporary reusable label. Further transport of the now temporarily lined label is made to carry it away from the cylinder, ultimately into contact with moving elements, such as envelopes or containers moving in a path. Transport may be done by tension on the composite linerless label, or by support on a conveyor, which may already be a part of the lined label applicator. The adhesive on the adhesive face of the label facilitates adherence of the labels to the temporary, reusable liners so that they can convey the labels in a transport direction to insure that the labels stay in place until it is desired to remove them to the liner. A vacuum cylinder also is preferably provided to secure the cut linerless label I transit to application to the temporary, reusable liner. The vacuum pulls air through the spaces in the surface of the cylinder, thereby providing a force holding labels on the anvil or cylinder.

The linerless label sheet may already have been printed, or it may be desirable to print indicia on the release coated faces thereof. For this purpose a printer, such as an ink jet print head, Thermal transfer (mass or dye), contact printer (lithographic, relief, gravure, etc.) or like structure, may be provided. If the ink jet print head applies hot melt ink, just prior to the print head a heated platen is preferably provided for heating the release coat face of the labels to make them receptive for the ink from the print head. Once the labels have been printed and it is desired to apply them to the moving elements, such as envelopes in the desired path, in addition to removing the force of the vacuum chamber it is desirable to positively separate the labels from the temporary, reusable support. For this purpose, a stripping system to remove the labels from the temporary, reusable liner may be used. One type of stripper system comprises one or a plurality of stripper elements, such as stripper rings having non-stick circumferential surfaces, associated with a peeler roll. After separation of the labels from the temporary, reusable support, the pressure sensitive face of each label is fed into contact with an element such as an envelope, and the envelope with label applied may be passed through nip rolls whereby the pressure sensitive adhesive is activated to insure adherence of the label onto the envelope. If the element to which the label is being applied is too thick for use with nip rollers, other conventional instructions for applying pressure to the back of the element while applying pressure from the top of the label may be used. Vise-like mechanisms, pinchers, reciprocating flat plates on both surfaces, and the like may be used.

To remove the labels from the temporary, reusable liner or support, a separating mechanism will be provided by the lined label applicator, which is ordinarily part of the function of that apparatus in removing liners from labels within the apparatus. The separating mechanism comprises a stripper element(s), preferably slides, rollers, ramps, plates, blades, or stripper rings, which extend upwardly above the tops of the temporarily supported linerless label. Another, usually non-flat element in the system, such as a roll or edge (e.g., to bend the labeless liner over a non-flat area to raise an edge which can be freed for engagement and support) is used to bend or deflect each label away from the temporary, reusable liner, usually by raising an edge or corner which can be used to lift the remaining label from the temporary, reusable liner. The stripper, at least the portions that will contact the adhesive faces of the labels, may be made of or coated with non-stick material, such as polytetrafluoroethylene or crosslinked polysiloxanes. The stripper may also be the container or substrate which is to be labeled. A peeler roll, if present, may be mounted for rotation about an axis parallel to that of a vacuum, and may be provided just above the temporary, reusable liner and just prior to the stripper. A peeler roller may aid in removing the labels from the temporary, reusable liner by causing an upward bend in each label, thus causing a portion of the label to travel in a direction that is tangent to both the peeler roll and the stripper, and to be deflected by the stripper. The stripper can rotate with a drive shaft, or could be loosely mounted on a drive shaft so that relative rotation between them is possible, or could be a fixed blade or free wheeling blade.

Drive mechanisms or brakes may be placed within the module on various elements which might need or tolerate a drive mechanism or brakes, such as for example, 8, 14, 20, 26, 32, 52, and 54.

Figures 2, 2A:
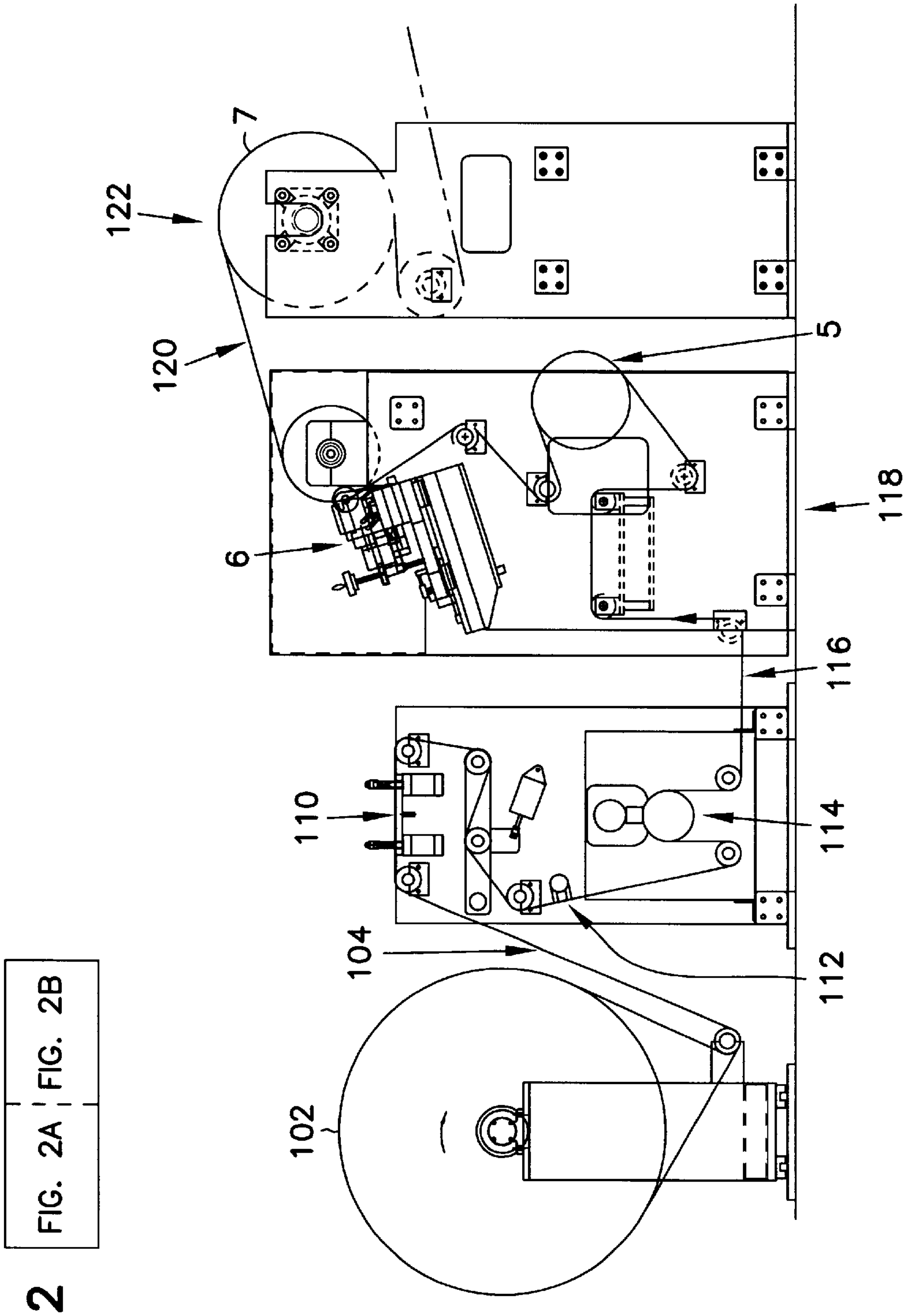
FIGS. 2, 2A, and 2B show one format of apparatus according to the present invention where adhesive is applied to the label material after printing but prior to cutting and assembling on a temporary carrier.
Figure 2B:
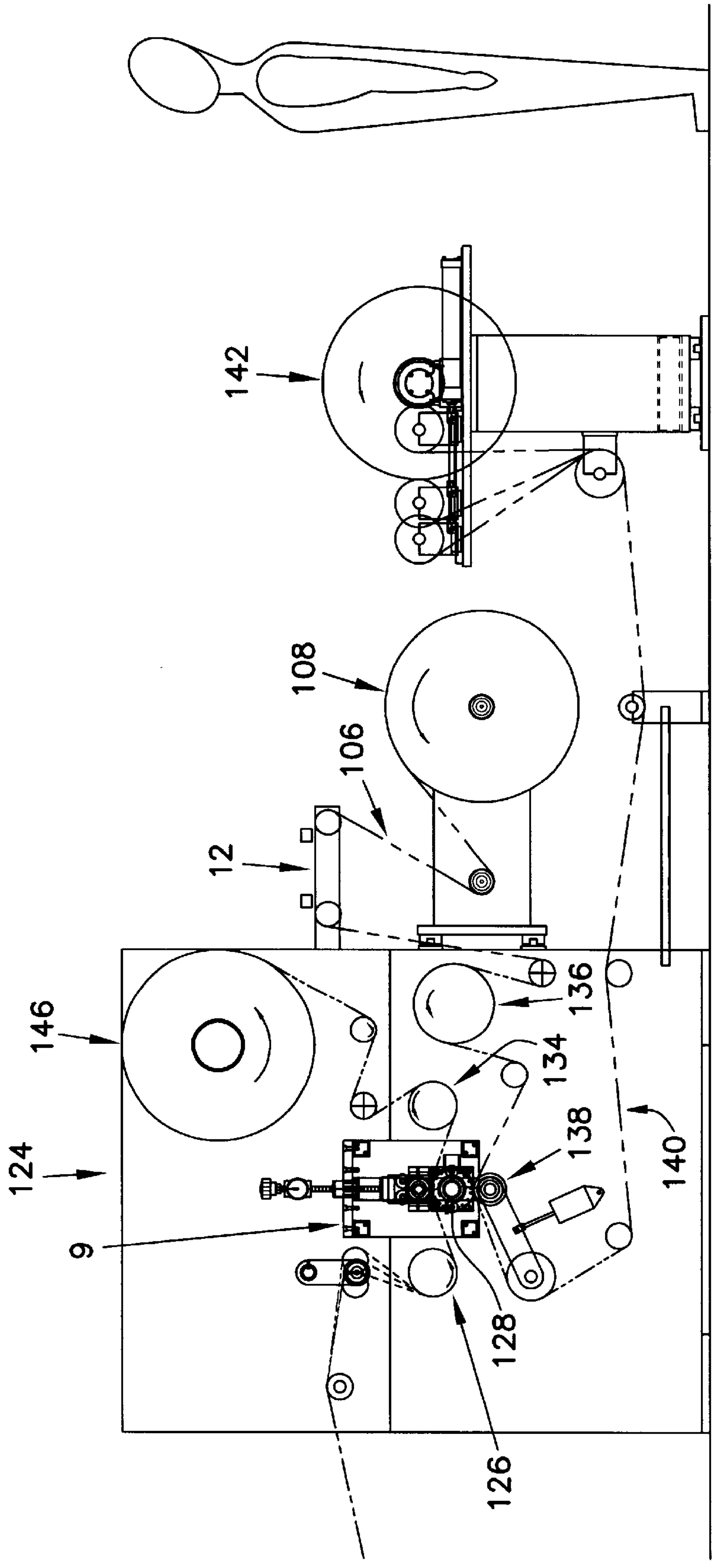

FIG. 2 shows a system 100 in which a roll 102 of printed label material 104 is coated with adhesive prior to association with a temporary, reusable carrier 106 which is supplied from a roll 108. After initial treatment (e.g., splicing at label unwind splice table 110, cleaning on a web cleaner 112, and corona discharge treatment with a corona discharger 114), the prepared and pretreated label material 116 is transferred into an adhesive coating unit 118 where adhesive (e.g., a thermal or hot melt adhesive) is applied. The adhesive coated stock 120 may then be sent to a chill unit 122 and then to the die cutting and application unit 124. Within the die cutting application unit or module 124 may be an infeed/registration roll 126 and a die cutting station with vacuum transfer 128. As the individual labels (not shown) are cut, they may be (according to this description of this aspect of the invention) supported within the die cutting with vacuum transfer segment 128 and applied (adhesive side down or adhesive side up) onto a resuable temporary carrier 106 which has been unwound from a supply roll 108. The reusable carrier material 106 may of course be recycled or reused material. Within the die cutting with vacuum transfer segment 128 may be, for example, an outfeed matrix pull roll 134 which removes the severed matrix (not shown), an infeed temporary carrier pull roll 136, and a laminating roll 138. The laminated, adhesive coated labels (not shown) on the reusable temporary carrier assembly 140 is then transported to a rewind takeup 142 and the matrix 144 is taken to the matrix rewind roll 146.

What is claimed is:

1. A method for enabling a linered label applicator to accept linerless labels on a sheet for application to the surface of elements, the method comprising associating a source of precut linerless labels on a roll of reusable, temporary liner sheet to said linered label applicator so that a composite of:

a) said reusable, temporary liner sheet and b) said pre-cut linerless labels, is fed into said linered label applicator where linered label is normally directed into said linered label applicator, removing the linerless labels from the reusable, temporary liner sheet and rolling the reusable, temporary liner into a roll.

2. A method according to claim 1, wherein cut-out linerless label is removed from said reusable, temporary liner sheet, and said cut-out linerless label is applied to a substrate comprising the surface of elements.

3. The method of claim 2 wherein said roll is used to feed linerless label on a reusable, temporary liner as a source of label comprising the steps in said applicator of:

bending said linerless label on said reusable, temporary liner to partially remove at least a part of said linerless label from said reusable, temporary liner to form a linerless label with at least an edge lifted from the reusable, temporary liner, having at least said lifted edge placed into contact with a surface to which the linerless label is to be applied, and attaching said linerless label to said surface.

4. The method of claim 1 wherein after removal of said cut-out linerless label from said reusable, temporary liner sheet, said reusable, temporary liner sheet is wound into a roll.

5. The method of claim 4 wherein said roll is used to feed linerless label on a reusable, temporary liner as a source of label comprising the steps in said applicator of:

bending said linerless label on said reusable, temporary liner to partially remove at least a part of said linerless label from said reusable, temporary liner to form a linerless label with at least an edge lifted from the reusable, temporary liner, having at least said lifted edge placed into contact with a surface to which the linerless label is to be applied, and attaching said linerless label to said surface.

6. The method of claim 1 wherein said roll is used to feed linerless label on a reusable, temporary liner as a source of label comprising the steps in said applicator of:

bending said linerless label on said reusable, temporary liner to partially remove at least a part of said linerless label from said reusable, temporary liner to form a linerless label with at least an edge lifted from the reusable, temporary liner, having at least said lifted edge placed into contact with a surface of one of the elements to which the linerless label is to be applied, and attaching said linerless label to said surface.

7. A method for enabling a linered label applicator to accept linerless labels on a sheet for application to the surface of elements, the method comprising associating a source of precut linerless labels on a roll of reusable, temporary liner sheet to said linered label applicator so that a composite of:

c) said reusable, temporary liner sheet and d) said pre-cut linerless labels, is formed and then fed into said linered label applicator where linered label is normally directed into said linered label applicator, wherein the pre-cut linerless labels are removed from the reusable, temporary liner sheet, the reusable, temporary liner sheet is then wound into a roll, the roll of reusable, temporary linerless label is unwound, and linerless labels are reapplied to the unwound roll of reusable, temporary liner sheet.

8. The method of claim 7, wherein after said rolls is unwound and linerless labels are applied to said reusable, temporary liner sheet to form a recycled roll, supported linerless label from said recycled roll is fed into said linered label applicator where linered label is normally directed into said linered label applicator.

9. The method of claim 7 wherein said roll is used to feed linerless label on a reusable, temporary liner as a source of label comprising the steps in said applicator of:

bending said linerless label on said reusable, temporary liner to partially remove at least a part of said linerless label from said reusable, temporary liner to form a linerless label with at least an edge lifted from the reusable, temporary liner, having at least said lifted edge placed into contact with a surface to which the linerless label is to be applied, and attaching said linerless label to said surface.

10. A method for enabling a linered label applicator to apply linerless labels from sheet to the surface of elements, the method comprising temporarily adhering precut linerless labels onto a roll of reusable, temporary liner sheet so that a composite of:

e) said reusable, temporary liner sheet and f) pre-cut linerless labels, is formed, and then feeding said composite into the linered label applicator so that pre-cut linerless labels are removed from the reusable, temporary liner sheet, and the reusable, temporary liner sheet is then wound into a roll, the roll of reusable, temporary linerless label is unwound, and linerless labels are reapplied to the unwound roll of reusable, temporary liner sheet.

11. The method of claim 10 wherein said roll is used to feed linerless label on a reusable, temporary liner as a source of label comprising the steps in said applicator of:

bending said linerless label on said reusable, temporary liner to partially remove at least a part of said linerless label from said reusable, temporary liner to form a linerless label with at least an edge lifted from the reusable, temporary liner, having at least said lifted edge placed into contact with a surface to which the linerless label is to be applied, and attaching said linerless label to said surface.

* * * * *